United States Patent
de Guzman et al.

(10) Patent No.: US 9,911,974 B2
(45) Date of Patent: Mar. 6, 2018

(54) COMPOSITE ANODE FOR LITHIUM ION BATTERIES

(71) Applicant: Wayne State University, Detroit, MI (US)

(72) Inventors: Rhet C. de Guzman, Detroit, MI (US); K. Y. Simon Ng, West Bloomfield, MI (US); Steven O. Salley, Grosse Pointe Park, MI (US)

(73) Assignee: Wayne State University, Detroit, MI (US)

( * ) Notice: Subject to any disclaimer, the term of this patent is extended or adjusted under 35 U.S.C. 154(b) by 631 days.

(21) Appl. No.: 14/350,858

(22) PCT Filed: Oct. 12, 2012

(86) PCT No.: PCT/US2012/059989
§ 371 (c)(1),
(2) Date: Apr. 10, 2014

(87) PCT Pub. No.: WO2013/056074
PCT Pub. Date: Apr. 18, 2013

(65) Prior Publication Data
US 2014/0329150 A1 Nov. 6, 2014

Related U.S. Application Data

(60) Provisional application No. 61/547,362, filed on Oct. 14, 2011.

(51) Int. Cl.
*H01M 4/36* (2006.01)
*H01M 4/04* (2006.01)
*H01M 4/1393* (2010.01)
*H01M 4/1395* (2010.01)
*H01M 4/38* (2006.01)
*H01M 4/133* (2010.01)
*H01M 4/134* (2010.01)
*H01M 4/587* (2010.01)
*H01M 4/583* (2010.01)
*H01M 10/0525* (2010.01)

(52) U.S. Cl.
CPC ......... *H01M 4/364* (2013.01); *H01M 4/0402* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/366* (2013.01); *H01M 4/386* (2013.01); *H01M 4/583* (2013.01); *H01M 4/587* (2013.01); *H01M 10/0525* (2013.01); *H01M 2220/20* (2013.01); *H01M 2220/30* (2013.01)

(58) Field of Classification Search
CPC ...... H01M 4/133; H01M 4/134; H01M 4/364; H01M 4/1393; H01M 4/1395
See application file for complete search history.

(56) References Cited

U.S. PATENT DOCUMENTS

2010/0310941 A1    12/2010  Kumta et al.
2011/0111303 A1    5/2011   Kung et al.
2011/0284805 A1*   11/2011  Samulski .......... B82Y 30/00
                                             252/503

OTHER PUBLICATIONS

International Search Report of PCT/US2012/059989, dated Feb. 22, 2013.
Zhu, Yanwu et al., "Graphene and Graphene Oxide: Synthesis, Properties, and Applications," *Adv. Mater.* (2010), 22, pp. 3906-3924.
Lee, J.K. et al., "Silicon nanoparticles-graphene paper composites for Li ion battery anodes," *Chem. Commun.*, (2010), 46, pp. 2025-2027.

* cited by examiner

*Primary Examiner* — Ladan Mohaddes
(74) *Attorney, Agent, or Firm* — Brinks Grilson & Lione

(57) ABSTRACT

A composite anode for a lithium-ion battery is manufactured from silicon nanoparticles having diameters mostly under 10 nm; providing an oxide layer on the silicon nanoparticles; dispersing the silicon nanoparticles in a polar liquid; providing a graphene oxide suspension; mixing the polar liquid containing the dispersed silicone nanoparticles with the graphene oxide suspension to obtain a composite mixture; probe-sonicating the mixture for a predetermined time; filtering the composite mixture to obtain a solid composite; drying the composite; and reducing the composite to obtain graphene and silicon.

7 Claims, 12 Drawing Sheets

| Composite Sample | Technique | Dispersion Illustration | Particle Distribution |
|---|---|---|---|
| S1 | Sonication | | Large agglometates (> 30x single particle size) |
| S2 | Probe Sonication | | Agglomerates (20-10x single particle size) |
| S3 | Surfactant (with Probe Sonication) | | Small clusters to lone particle distribution |

*FIG - 1*

COMPOSITE ANODE FOR LITHIUM ION BATTERIES

CROSS-REFERENCE TO RELATED APPLICATIONS

This application is a 371 national stage application of PCT Application No. PCT/US2012/059989, filed Oct. 12, 2012, which application claims the benefit of U.S. provisional application No. 61/547,362, filed on Oct. 14, 2011, the entirety of which being hereby incorporated by reference.

GOVERNMENT LICENSE RIGHTS

This invention was made with Government support under Contract No. DE-EE0002106 awarded by the Department of Energy. The Government has certain rights in this invention.

BACKGROUND OF THE INVENTION

The goal of increasing the specific capacity of anodes of lithium-ion batteries (LIBs) by nearly a factor of 10 through the substitution of graphite has tremendously influenced the direction of recent scientific efforts. Graphite has a theoretical capacity of about 372 mAh/g compared to silicon (Si) having a theoretical capacity of only about 3572 mAh/g. Utilization of Si promotes a high capacity lithium (Li) alloying reaction which produces a Li-rich phase ($Li_{15}Si_4$) compared with an intercalation reaction with graphite ($LiC_6$). However, the increased accommodation of $Li^+$ ions during charge-discharge cycles induces large volume variations (as much as about 370%) and stress on a bulk anode matrix that may ultimately shorten the useful life of the anode. In view of this hindrance, different strategic schemes have been pursued to alleviate the effect of volume expansion including the use of amorphous thin films, nanowires, nanotubes, and porous morphologies. Despite these advances, a significant capacity degradation during charge-discharge cycles (in the following called "cycling") is still observed, suggesting electrode fracturing and eventual electrical contact losses.

SUMMARY OF THE INVENTION

According to a first aspect of the invention, a composite anode for a lithium-ion battery comprises a bulk anode matrix formed by graphene sheets and a plurality of nanoparticles embedded in the graphene sheets, wherein the silicon nanoparticles have diameters mostly no greater than 10 nm and most of the silicon-containing nanoparticles are arranged in clusters of diameters no greater than 20 nm. Keeping agglomerations of the nanoparticle small increases the surface area of the clusters and enhances the performance of the battery. Preferably, a portion of the silicon nanoparticles may even be embedded as single nanoparticles.

According to another aspect of the invention, most of the silicon nanoparticle clusters and silicon nanoparticles are spaced apart from neighboring silicon nanoparticle clusters and silicon nanoparticles by a distance of at least about three times the diameter of an individual nanoparticle. Such a spacing allows for volume changes in the nanoparticles during lithiation without damaging the structure of the composite anode.

According to a further aspect of the invention, the embedded silicon nanoparticles amount to at least about 30% by weight of the total weight of the graphene sheets and the silicon nanoparticles combined. The performance may be further enhanced in composites, in which the embedded silicon nanoparticles amount to about or to at least about 50% by weight of the total weight of the graphene sheets and the silicon nanoparticles combined.

According to yet another aspect of the invention, the nanoparticles may coated with a carbon layer. The carbon coating further enhances the battery performance.

According to another aspect of the invention, the silicon nanoparticles may be doted with nitrogen for improving performance.

According to a further aspect of the invention, a method of manufacturing a composite anode for a lithium-ion battery comprises the steps of providing silicon nanoparticles having diameters mostly no greater than 10 nm; providing an oxide layer on the silicon nanoparticles; dispersing the silicon nanoparticles in a polar liquid; providing a graphene oxide suspension; mixing the polar liquid containing the dispersed silicone nanoparticles with the graphene oxide suspension to obtain a composite mixture; probe-sonicating the composite mixture for a predetermined time; filtering the composite mixture to obtain a solid composite; drying the composite, and reducing the solid composite to obtain and to remove the oxide layer from the silicon nanoparticles.

According to yet another aspect of the invention, the oxide layer may be produced by exposure to ambient air.

The at least about 90% of the polar liquid consists of methanol according to a further aspect of the invention.

According to one aspect of the invention, filtering of the composite mixture is performed by vacuum filtering.

According to another aspect of the invention, drying of the composite is performed by air-drying.

According to yet another aspect of the invention, reduction of the solid composite to obtain graphene and to remove the oxide layer from the silicon nanoparticles is performed by thermal reduction.

According to a further aspect of the invention, the polar liquid contains a surfactant. The surfactant may amount to between about 0.5% to about 2% by volume of the polar liquid.

According to yet another aspect of the invention, the surfactant may be n-octyl alcohol and may amount to about 1% by volume of the polar liquid.

According to one aspect of the invention, the method may comprise the further step of nitriding the silicone nanoparticles before dispersing the silicon nanoparticles in the polar liquid. Nitriding the silicon nanoparticles may, for example, be performed by heating the silicon nanoparticles in a furnace with a feed of anhydrous ammonia.

According to another aspect of the invention, the method may comprise the further step of depositing carbon on the silicone nanoparticles before dispersing the silicon nanoparticles in the polar liquid. Depositing the carbon on the silicon nanoparticles may, for example, be performed by heating the silicon nanoparticles in a furnace with a feed of acetylene gas and argon gas.

Further details and advantages of the invention become apparent from the following description of the attached drawings illustrating several preferred embodiments.

BRIEF DESCRIPTION OF THE DRAWINGS

The drawings are included for illustrative purposes only and are not intended to limit the scope of the invention.

FIG. 1 schematically shows three different methods of dispersing graphene oxide in a polar liquid.

DETAILED DESCRIPTION OF THE DRAWINGS

A. SiNP-Graphene Composite Anode

A recent state-of-the art material, graphene, is a carbonaceous support material containing highly organized $sp^2$-bonded carbon atoms that provide outstanding mechanical and electrical properties compared with other known materials. Graphene has the potential to provide limits and control of Si volume expansion while assisting in electron conductivity within composite anodes. It also has excellent chemical stability that reduces side reactions between the SiNPs and the electrolyte of the LIB. These unwanted side reactions form an unstable nonconducting solid-electrolyte interphase (SEI) that degrades electrochemical performance. Thus, it is desirable to reduce these side reactions.

Si particles with diameters in the nanometer scale are referred to as silicon nanoparticles or SiNP. SiNPs benefit from having high surface area: increasing sites for Lithium (Li) alloying ("lithiation") to improve electrode capacity, increase discharge rates and increase fracture toughness to promote stability. For example, about 30-50 nm sized SiNP may be embedded within a graphene-based matrix producing a SiNP-graphene composite. Such composite anodes may be synthesized by thermal reduction of a hydrophilic suspension of graphene oxide and silicon oxide. The composites exhibit high capacities under applied current densities of about 100-300 mA/g) with improved retention in spite of significant degradation during the early cycles, a phenomenon that may be attributable to inadequate dispersion of the SiNP. A cycle contains one step of charging an LIB followed by a step of discharging the LIB. Cycling the LIB is in the following used to describe the execution of a plurality of consecutive cycles on the LIB.

Proper dispersion of the SiNPs reduces volume expansion stress and improves nanomaterial behavior and macroscale performance. Likewise, improvement of dispersion delays merging and agglomeration of particles during cycling as a result of hindered ion transport and/or to unstable SEI.

A further investigation of the relationship between dispersion and electrochemical cycling performance has been performed through the use of SiNP-graphene composites prepared using three methods of particle dispersion as depicted in FIG. 1. The particle dispersion of sample S1 was produced by sonication; the particle dispersion of sample S2 was produced by high-power/energy sonics; and The particle dispersion of sample S3 was produced by high-power/energy sonication combined with n-octyl alcohol serving as a surfactant. The effect of preparative methods on the SiNP distribution was evaluated by imaging the size of particles (or aggregated clusters) relative to the individual particle dimension, and the resulting electrochemical performances was assessed using variable current density cycles.

Figure 2:
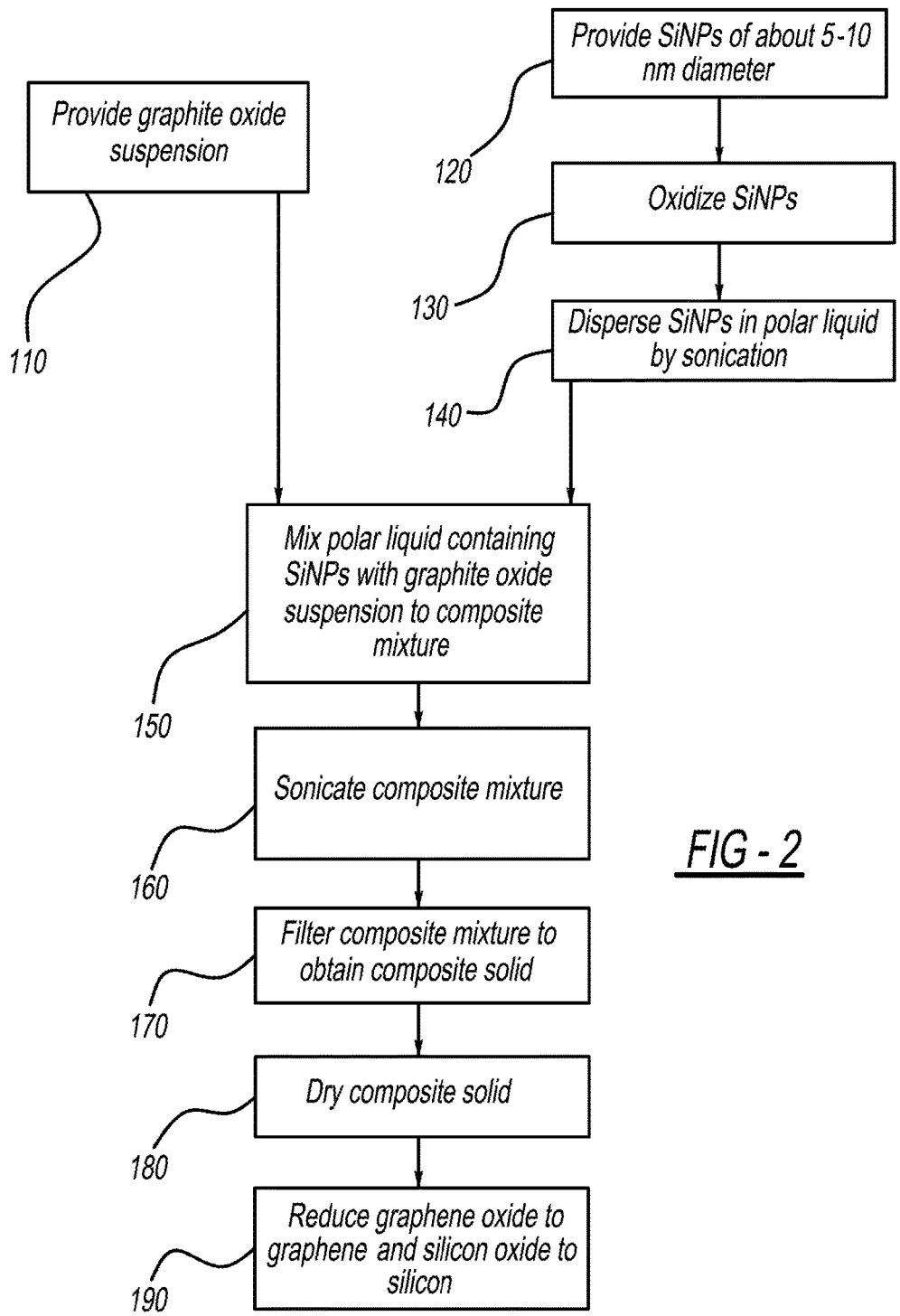
FIG. 2 shows a flow chart with steps of manufacturing a composite SiNP-graphene anode.

The general process of manufacturing the samples S1, S2, and S3 is illustrated in FIG. 2

Graphite Oxide Synthesis

The graphene precursor, graphite oxide was prepared using a two-stage Hummers' method as indicated in step 110 in FIG. 2. Graphite (about 2 g, Dixon Microfyne, Ashbury, N.J.) was pre-oxidized in an oil bath at about 80° C. for about 4.5 hours using about 30 mL $H_2SO_4$ (about 95%) with pre-dissolved $K_2S_2O_8$ (about 1 g) and $P_2O_5$ (about 1 g). After cooling, the solution was diluted with about 1 L of deionized water (DI water), and then filtered and washed until the filtrate was pH neutral. The pre-oxidized graphite was mixed with about 80 mL $H_2SO_4$ in an ice bath. While maintaining stirring, $KMnO_4$ (10 g) was added stepwise for the reaction to proceed just below room temperature for 2 hours then followed by careful dilution using about 150 mL DI water. During this process, the solution temperature was kept below about 50° C. After additional stirring for about 2 hours, further dilution with about 500 mL DI water was then followed by slow addition of $H_2O_2$ (about 30%, about 8.3 mL). The mixture was then allowed to settle overnight and then decanted. The product was purified using repeated rinsing and centrifugation with about 5% HCl and DI water. The resulting graphite oxide suspension (about 10 mg/mL) was then stored in an amber bottle at room temperature.

Silicon Nanoparticle Preparation

A distribution if SiNPs having diameters of about 5-10 nm was acquired from Meliorum Nanotechnology (Rochester, N.Y.) as indicated in step 120 of FIG. 2. The particles were stored in an Ar-filled isolation glovebox with $O_2$ and moisture contents both amounting to less than about 1 ppm. Prior to use, the particles were exposed to air overnight in order to develop ample surface hydrophilic oxide layer for proper dispersion as indicated in step 130 of FIG. 2.

Composite Anode Formation

The surface-oxidized SiNPs were weighed and then dispersed in three different ways, generally indicated in step 140 of FIG. 2. All three procedures have in common that oxidized SiNPs were dispersed in a polar liquid by sonication. Differences among the procedures are illustrated in a table format in FIG. 1. For the first sample S1, the oxidized SiNPs were dispersed in methanol. An external sonication (Branson Model 2510, Danbury, Conn., 100 W, 50/60 Hz) of the oxidized SiNPs was performed for about one hour. For the second sample S2, the oxidized SiNPs were likewise dispersed in methanol. Sonic probing at a higher frequency (Misonix, Ultrasonic Cell Disruptor, Farmingdale, N.Y., 100 W, about 22.5 kHz) was performed for about one hour. For the third sample S3, a dispersion was prepared by dispersing the SiNP in methanol with about 1% (v/v) content of n-octyl alcohol (about 99%) by sonic probing under the conditions described for S2. The n-octyl alcohol acts as a surfactant of the SiNPs.

After the dispersion step, a self-contained composite anode was produced without the need for binders or conductive diluents. As indicated in step 150 of FIG. 2, an appropriate amount of graphite oxide suspension was added to the dispersion to make a SiNP:graphene weight ratio of about 1:1. The resulting composite mixture was then subjected to the same sonication technique (from prior step) for about 2 hours as indicated in step 160. Sonics exfoliate the expanded structure of graphite oxide to form graphene oxide platelets while at the same time dispersing the SiNPs. All sonics-based steps were performed in room temperature conditions and were closely monitored to minimize temperature increase. After this, as indicated in step 170, the sample was filtered. The filtering process was performed by vacuum-filtering (setup: Millipore 47 mm all-glass vacuum filter holder—funnel and flask; filter: about 0.2 µm pore, Whatman Anodisc), forming a solid composite. During filtration, SiNP cross over was minimized due to the initial deposition of graphene oxide platelets on the filter surface. The resulting composite solid was then dried as indicated in step 180 to form the composite anode. In this step, the composite solid was air-dried. In step 190, the dried composite solid the underwent a reduction to reduce the graphene oxide platelets stacked in the composite solid to graphene platelets and the oxidized silicon to silicon. In the described example, the reduction was performed by thermal reduction. The reduction was carried out using about 10% $H_2$ (balance Ar, about 100 mL/min) at about 700° C. for about 1.25 hours. After the reduction, the isolated SiNP-graphene composite material forming the composite anode was sampled, weighed and prepared for testing.

Battery Assembly

Figure 4:
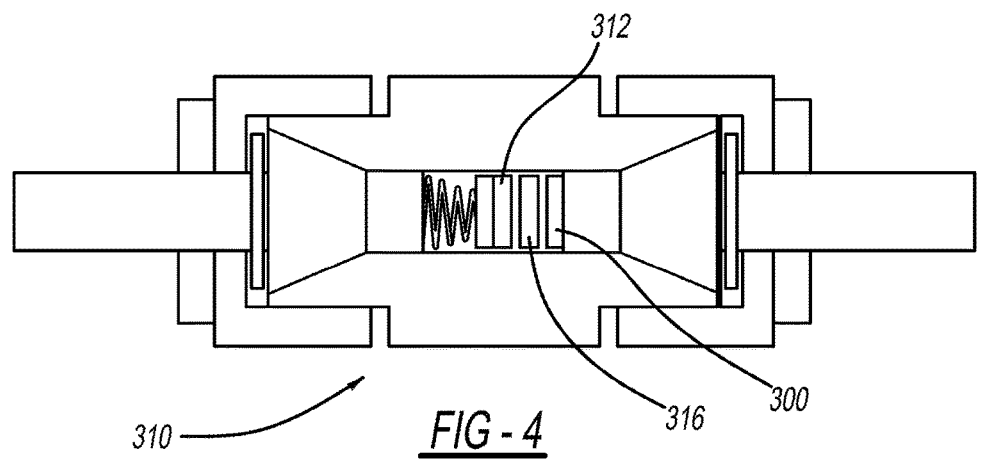
FIG. 4 schematically shows a first battery utilizing a composite SiNP-graphene anode.

The battery cells were assembled in a Swagelok-type cell 310 schematically shown in FIG. 4. The cell 310 was loaded with about 1 mg of the composite (about 1.5 mg/cm$^2$, about 5-10 µm thick) as the working electrode, anode 300. Li metal (about 99.9%, about 0.75 mm thick, Alfa-Aesar) acted as both counter and reference electrode, cathode 312, in a half-cell configuration. A solution of about 1.0M $LiPF_6$ dissolved in an ethylene carbonate (EC)/dimethyl carbonate (DMC) 1:1 (v/v) solution was used as the electrolyte. A separator 316 was arranged between the anode 300 and the cathode 312 to prevent direct contact. The cells 310 were fabricated and cycled in an Ar-filled isolation glovebox. These battery cells 310 were assembled for experimental purposes and do not represent a final product. All measurements were chosen for small-scale experiments. As will be described below in connection with FIG. 5, button cells 410 were also assembled. The technology, however, is also suited for large-scale applications, such as vehicle batteries.

General Characterizations

Scanning electron microscopy (SEM) images were taken using a JEOL (Peabody, Mass.) Model JSM-6510LV-LGS at 25 kV. The chemical composition was analyzed using the equipped Energy Dispersive X-ray Spectrometer (EDS). Thermogravimetric analysis (TGA) was carried out on a Model TA Instruments 2960 (New Castle, Del.) at a heating rate of about 10° C./min in air, from which the contents of Si in the composites were determined considering the adjustments for Si oxidation. graphene oxide platelet imaging was acquired by atomic force microscopy (AFM) (Digital Instruments Dimension 3100, Plainview, N.Y.) by immobilizing a representative area onto a freshly cleaved mica surface at room temperature under $N_2$ purge. A normal tapping mode silicon cantilever (300 kHz, 40 N/m, T300, nanoScience Instruments/Vista Probes, Phoenix, Ariz.) was utilized for optimum resolution.

Dispersion Characterization

The composite morphology was investigated using a transmission electron microscope (TEM). TEM micrographs were acquired on a JEOL-2010 FasTEM at 200 kV. The TEM samples were prepared by dispersing a small area of dry anode in ethanol with sonication for about one hour. Then a drop of sample solution was casted on 300 mesh copper TEM grids covered with thin amorphous carbon films.

Electrochemical Characterizations

Electrochemical cycling of the assembled cells was performed galvanostatically with a cut-off voltage range of about 0.02-2.0V while maintaining a constant current density of about 500 mA/g for about 40 cycles. This current density was used to determine the highest (optimal) capacity of the composite material. After this step, varying densities of about 900, about 1500, and about 2500 mA/g were used after every 10 cycles to assess the rate performance of the cells. The cells were then cycled back to a current density of about 500 mA/g in order to measure the changes in capacity following previous high current density cycles. Cyclic voltammetry (CV) measurement was performed using a single scan rate of about 0.04 mV/s over a range of about 0.01 to about 2.0V to gain a better understanding of the reaction mechanisms. The baseline performance was evaluated using about 1 mg of graphene (about 0.7 mg/cm$^2$, about 25 µm thick) without any SiNP loading. In all the electrochemical tests, a Gamry (Warminster, Pa.) Reference 3000 and series G 300 potentiostat/galvanostat was used.

Graphene Characterizations

The graphene oxide (around 1 µm×1 µm) platelets obtained from the graphite oxide were about a nanometer thick. After the filtration/formation process, the graphene oxide platelets were stacked together to form a film that is about 4 µm thick. Thermal reduction produced a graphene film with an expanded thickness of about 25 µm. EDS surface chemical analysis shows that the graphene oxide has about 33% (w/w) oxygen content (about 66% C and less than about 1% trace: Al, Cl and S), suggesting the presence of imperfections. Moreover, about 10% oxygen (about 89% C and less than about 1% trace: Al, Cl and S) is still retained after reduction to graphene, further suggesting that few $sp^3$-hybridized carbon atoms are recovered back into an $sp^2$-hybridized state. This in turn retains distortions in the graphene morphology. Close examination of charge-discharge profiles of high quality graphene-based electrodes indicate a different insertion mechanism (e.g., edge type and adsorption at both sides of sheets) compared with stable graphite electrodes (charge: about 0.1 V, discharge: about 0.2 V). Using graphene, the charge and discharge activity occurs at higher potentials. As a result, stable interactions with the electrolyte are possibly compromised and poorer cycling stability (compared with graphite) was observed. Thus, a matrix consisting of imperfect graphene layers may offer better cycling stability compared to a small number of layers of pristine graphene and better conductivity compared to graphite.

SiNP Selection

According to literature, an optimal size for SiNPs as a LIB anode material is smaller than about 20 nm. Thus, the SiNP size was chosen within a range of about 5-10 nm.

Dispersion

FIG. 1 shows the schematic images of SiNP-graphene composites produced through different dispersion techniques. Large particle agglomerations greater than 300 nm are observed in S1, which suggests that the applied energy is not strong enough to disperse the SiNPs and thus agglomeration occurs. In S2, the agglomerations are smaller than in S1; and smaller particles are now seen dispersed throughout the material. The average size of the smaller particles appears to range around 30 nm. Finally, for producing S3, a surfactant-assisted procedure, the agglomerated particles are less evident and small particle aggregates in a range of about 10-20 nm are more predominant. This can be attributed to micelle formation due to the added surfactant n-octyl alcohol which promotes the separation of the SiNPs and mitigates re-agglomeration. Closer examination of the S3 dispersion reveals that small particle clusters (highlighted, some are even single particles) are dispersed uniformly. EDS and TGA results indicate almost identical Si content of about 50% (w/w) for all these reduced composite anodes. While the present method was performed with a 50% content of SiNP, a lower content of about 40% is also within the scope of the present invention. These tests coupled with the fact that the particles are smallest after procedure S3 further indicate that dispersion of SiNPs is most complete in this composite. Close comparison of degree of Si particle dispersion with previously published results lustrates improved single particle distribution with interparticle spacings greater than about three times the diameter.

Electrochemical Performance

Figure 6A:
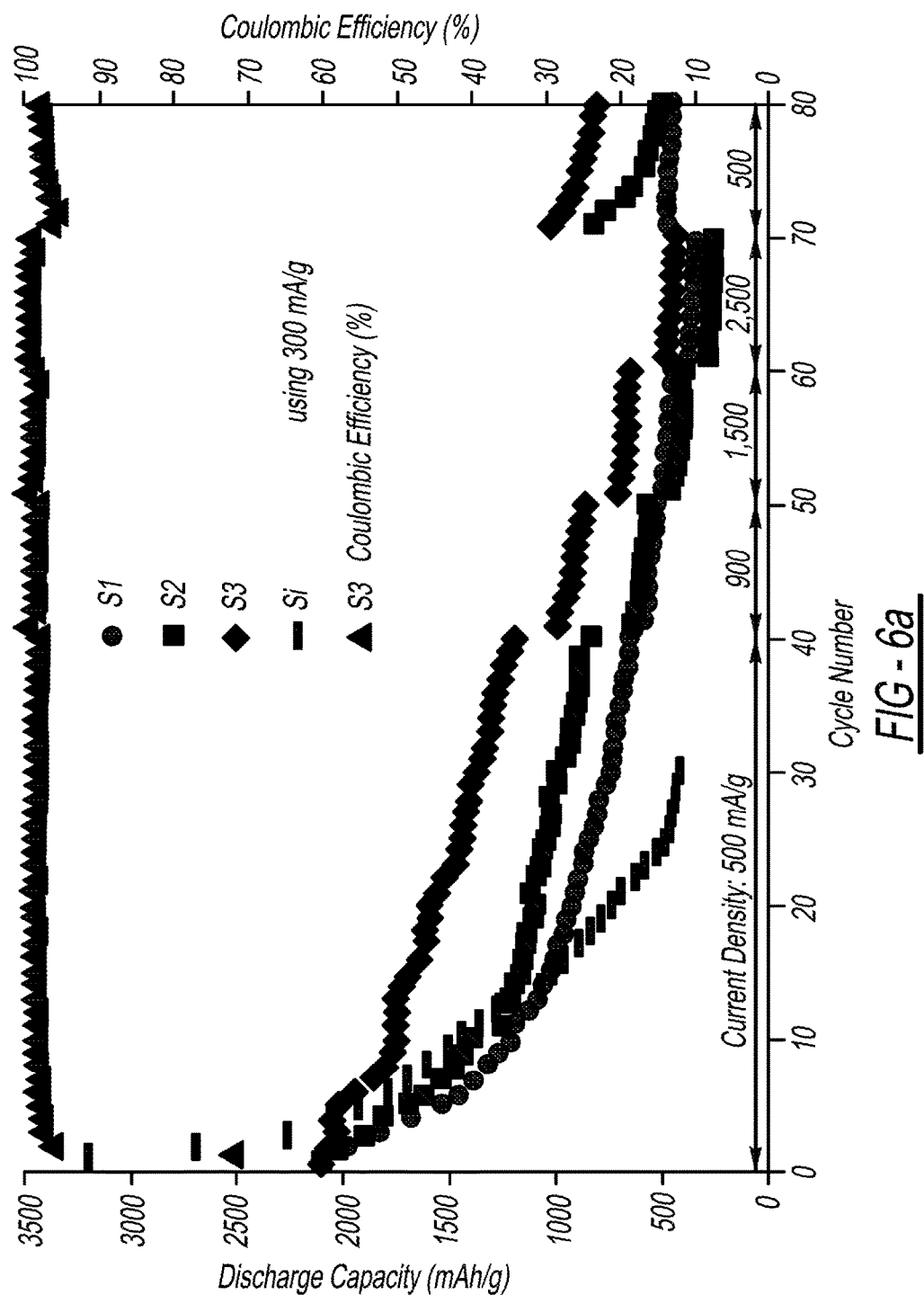
FIG. 6a shows a diagram of the cycling performance of three composite SiNP-graphene anodes made from three samples S1, S2 and S3 using various current densities in comparison with a silicon anode for a current density of 300 mA/g (from literature), and further the Coulombic efficiency of sample S3.
Figure 6B:
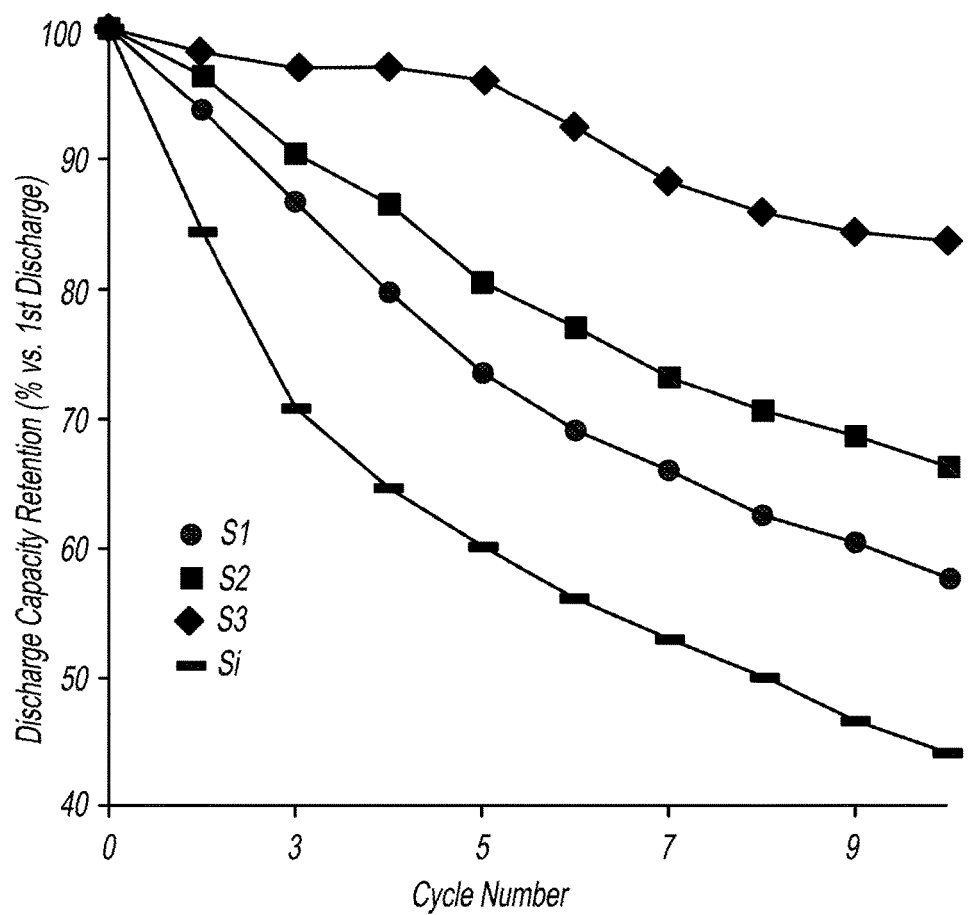
FIG. 6b shows a diagram of a discharge capacity retention of the same samples as FIG. 6a on a percentage scale.

The electrochemical cycling performance of the three composite anodes is presented in FIGS. 6a and 6b. FIG. 6a shows absolute measurements, while FIG. 6b shows percentages, where the initial discharge capacity has been set to be 100%. In order to determine the highest capacity of the composite anodes, a relatively low current density of about 500 mA/g was initially applied for the first forty cycles. Cycling at this value, the first discharge of all three composites was at about 2100 mAh/g with the following Coulombic efficiencies: about 80% for S1, about 72% for S2, and about 67% for S3. Coulombic efficiency is the quotient of charge capacity over discharge capacity. Since the composite composition is about 50% Si, this initial capacity output is expected and approaches the theoretical limit. The initial inefficiency can be attributed to the formation of the SEI layer and possibly other side reactions as a result of the high surface area of both SiNP and graphene, with the greatest bearing observed with S3. The demonstrated efficiencies are a significant improvement compared with previously reported graphene anodes which range from 22% to 58% and comparable with other reports for SiNP of about 58 to about 75%. FIG. 6a also shows cycling values of pristine Si cycled at about 300 mA/g as reported in the literature. The result clearly indicates that all three composites exhibit a better cycling performance even with higher current densities. Along with a high Coulombic efficiency, this strongly suggests that effectively coupling SiNP and graphene can lead to a promising anode material.

The next 14 cycles of S1 showed a very steep drop in discharge capacity from about 2000 to about 1000 mAh/g (about 50% of the initial discharge capacity) with an average efficiency of about 98%. At this point, Si alone displayed a similar absolute capacity. However, considering the lower initial discharge capacity of S1, S1 shows improved capacity retention compared to Si. Continuing until cycle number 40, a much slower rate of capacity decay was observed, with a capacity value of about 650 mAh/g at about 98% efficiency. In relation to the results of a pure graphene anode, where only the initial run demonstrated very low Coulombic efficiency (afterwards the reversible capacity is stabilized), this observed early cycle decay can be attributed to the SiNP component stability. This predominant observation in the literature has led some to conclude that pristine Si particles have poor cycling stability. Based on the morphology of S1, it rather seems that the agglomerated SiNPs are acting as macroscale Si and exhibit the same difficulties with as severe volume expansion resulting in structure destruction. Thus the effects caused by the relatively large SiNP aggregates or clusters counteract the stabilizing effect of the graphene matrix. With this, it is presumed that even using graphene material that exhibits improved cycling stability would bring minimal improvements, unless proper focus to the SiNPs is given.

Still referring to FIGS. 6a and 6b, the capacity retention for composite S2 presents a slight improvement compared to S1. At cycle 15, the reversible capacity is about 1200 mAh/g (about 98% efficiency) which translates to an improvement of about 20% compared with both S1 and Si. It is also evident that the decay slope is less steep in S2 compared with S1. At the end of cycle 40, S2 still retains an observed capacity of about 850 mAh/g (about 98% efficiency). These improvements are likely due to the better dispersion of the SiNPs, since that is the only differentiating trait between the two. As particles are less agglomerated, the SiNP behaves better in cycling the $Li^+$ ions.

As further evident from FIGS. 6a and 6b, a further improvement of the dispersion was achieved by using n-octyl alcohol as surfactant for producing S3. As FIGS. 6a and 6b show, S3 maintains and improved capacity retention in comparison with the other three samples. After 15 cycles the discharge capacity output is about 1700 mAh/g, amounting to an improvement of about 70% and about 42% over S1 and S2, respectively. The key for this improved performance can be attributed to the capacity retention at early runs. A closer observation of the composites' relative capacity (vs. the first discharge) after the first 10 cycles as indicated in FIG. 5b distinctly illustrates that significant capacity degradation occurs during the early cycles. At cycle 5, S3 showed substantial capacity retention (about 96%) compared with S1 (about 74%), S2 (about 80%) and Si (about 60%). Beyond this point, S3 displays a capacity drop of less than about 1% per cycle, strongly correlated with the extent of SiNP dispersion. With this improved capacity retention, S3 has retained a capacity of about 1200 mAh/g (about 57% of initial) after 40 cycles, about 85% and about 41% above S1 and S2, respectively.

Figure 7:
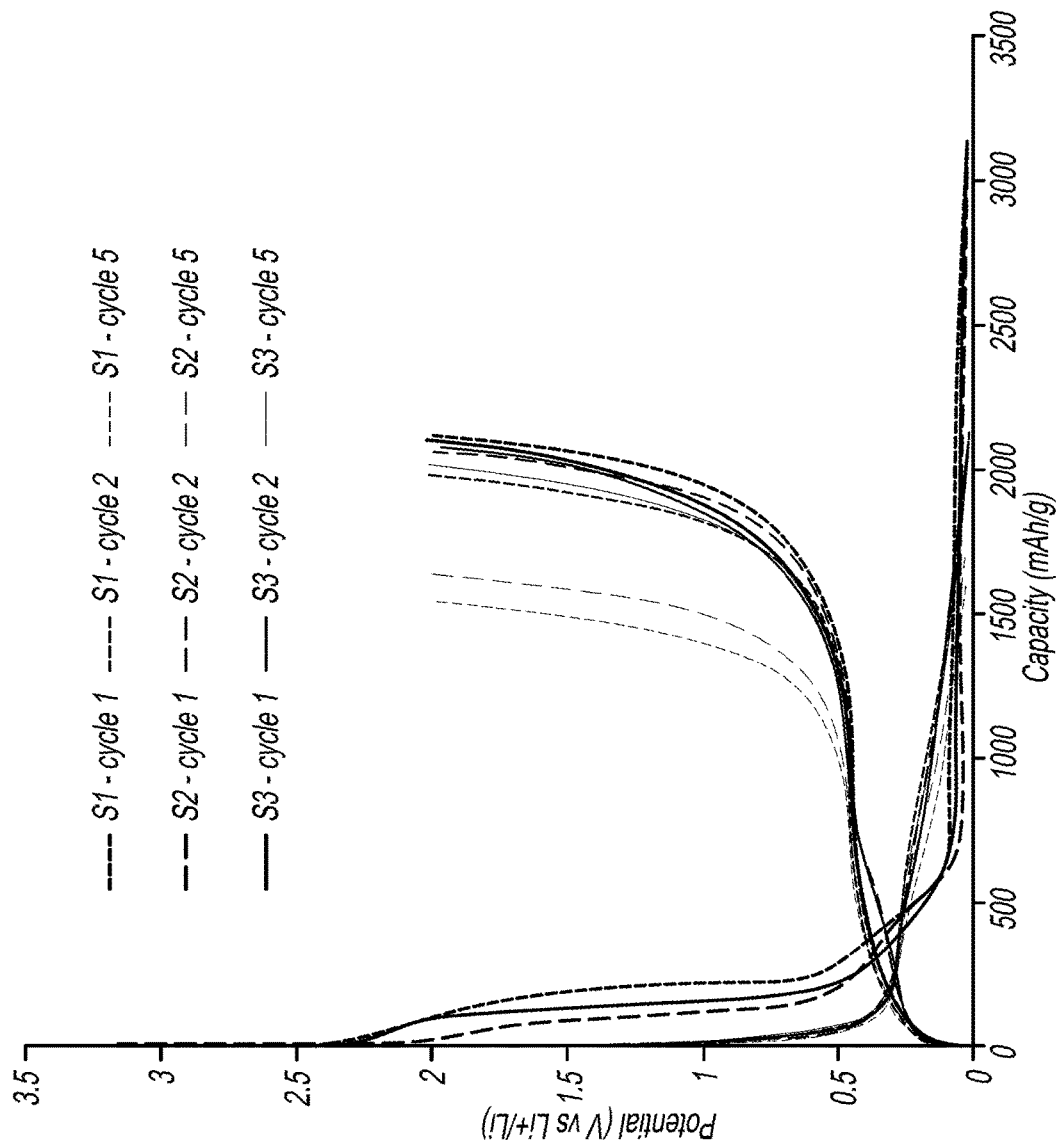
FIG. 7 shows charge-discharge profiles of samples S1, S2 and S3 using 500 mA/g.

To elucidate the improvement brought by particle dispersion, FIG. 7 shows the charge and discharge profiles of the first, second, and fifth cycle plotted in FIGS. 6a and 6b. The three composites were cycled using a current density of about 500 mA/g. In general, highly distinct plateau regions were observed beginning at 0.3 V during charge and at 0.5 V during discharge. During the composites' first charge, solid-electrolyte interphase (SEI) formation-related features are the predominant characteristic of the curves. The interphase is known to have diminished ionic conductivity compared with the electrolyte. As a result, reduced discharges are observed with efficiencies about 70%. The second and fifth cycles of the composites appear to be very similar except for some key characteristics displayed by the S3 discharges. While the S1 and S2 performances reach the dealloying potential at about 0.5 V immediately, the curve of S3 involved another possible mechanism that resulted in a linear potential climb with a smaller slope than the other two. After reaching the plateau region, exponential curves continue almost vertically upward to the high potential states. In S3, however, a slightly different; sloping exponential curve with less defined inflection point forms a more circular arch that indicates some degree of intercalation and deintercalation of the graphene matrix itself. Specifically, the cycling peaks of S3 appearing at less than about 0.1 V and peaks that are broadened between about 0.25 V and about 0.3 V can be attributed to the graphene's own contribution during lithiation and delithiation, respectively.

Through these observations, the following insights are gained: Single SiNPs have an increased surface area in comparison with agglomerated SiNPs. As improvements in SiNP dispersion are attained, the occurrence of single, non-agglomerated particles also improves. Thus, the network of graphene matrix now allows for proper coverage of isolated particles. During charging, $Li^+$ ions are accommodated by both the stable graphene and, in a greater number, by the high capacity SiNPs. Since the graphene network includes nanoparticles with a large surface area, maximized Li accommodation providing a high capacity with highly efficient electron transport is achieved. At discharge, the CV curves indicate a predominant discharge peak at about 0.5 V corresponding to a SiNP-based delithiation. The structure likewise allows for efficient transport of $Li^+$ ions out of the composite material with limited irreversibilities as evidenced by the small decrease in intensity of the CV peaks. Also, since the SiNPs are non-agglomerated, cycling stresses that would otherwise cause failure on bulk materials are mitigated via dislocation movements. All of these contribute to the improvement of cycling stability of the overall composite anode.

With these desirable traits, S3 has displayed improved rate capacities in contrast with the other two composites as seen in the latter part of FIG. 6. Increasing the current density applied to about 900 mA/g, the capacity output of S3 ranged from about 1000 to about 880 mAh/g. For S1 and S2, smaller discharge capacities were observed, ranging from about 600 mAh/g to about 525 mAh/g and about 650 mAh/g to about 575 mAh/g, respectively. At the highest current applied, about 2500 mA/g, S3 still outperformed S1 and S2 by having a stable retained capacity of about 440-490 mAh/g. In general, S3 showed improvements in two tested areas: (a) capacity retention (at low current density) as well as (b) improved rate capability as compared with S1 and S2. However it is noteworthy that S3 still exhibits a decreasing capacity (less than 1% drop every cycle) which can be credited to the structural change brought by the electrolyte penetration forming nonconductive SEI barrier between SiNP and conducting carbon. S3 also shows that at increased rates the drops in discharges are more pronounced than the other two composites. The margins between capacities at each current density level used are becoming smaller, amounting to about 55% at a current density of about 900 mA/g to a discharge capacity of about 330 mAh/g, to about 42% at about 1500 mA/g to about 200 mAh/g and to about 27% at about 2500 mA/g to about 100 mAh/g.

A possible explanation can be seen in the morphology of the Si after the electrochemical cycles are completed. The originally spherical SiNPs show a vein-like distribution of Si. It appears that, during high rates of electrochemical cycling, phase transformations occur, with the electrolyte saturation the SiNPs getting dislodged from the matrix, then agglomerated, and then apparently filling up the volume within the folds of the graphene matrix.

Aside from the irreversible capacity loss linked to the transformations, the decrease of the nanoparticle characteristics of Si eventually led to declined performance of S3 compared with early cycles. Similar and even greater morphological changes of Si than in S3 occurred in S2. The particle transformation results in a surface area decrease in S3, S2, and S1. The largest decrease in capacity is expected in S3 due to the large number of unagglomerated SiNPs.

Upon cycling back to the original current loading at about 500 mA/g, S3 displayed the best recovery obtaining about 80% of its discharge capacity from cycle 40. However, from cycles 70 to 80 on, a decay is observed in the curves of both S2 and S3. This decay is attributed to the morphological change. Since S3 still has the better surface area and size morphology than S2, a lower absolute capacity decay was still observed. This is a direct indication that even as the morphology of SiNPs tend to change at high current rates, having a good starting particle dispersion such as in S3 will lead to better overall performance.

In summary, graphene has been demonstrated as a stable matrix material that supports high capacity SiNPs. Likewise, improvement of the SiNP dispersion within the composite results in improved capacity retention as well as rate capability.

B. Modified-SiNP-Graphene Composite Anode

As indicated above graphene electrodes that contain void spaces may even be better able to accommodate the volume change of the anode material. Such works exhibit improved performance. The preparation of such voids or defects, however, involves etching holes into oxide layers using a highly hazardous acid, HF, which requires extensive safety precautions. An alternative solution achieves an increased tolerance to volume changes during lithiating and delithiating the SiNP by chemical introduction of impurities or dopants to the SiNPs instead of the graphene matrix.

For example, LIB performance can be improved by using modified SiNP (mSiNP). Two approaches according to further aspects of the present invention are introduced below. One approach uses C-deposited SiNPs (CSiNPs), while the other one uses $SiN_x$ nanoparticles ($SiN_x$NPs). These techniques are coupled with the improved surfactant-assisted particle dispersion procedure, described above in connection with sample S3, that can create a well dispersed mSiNP within a graphene matrix. Overall, improvements in cycling performance brought by these modifications contribute to the further advancement of SiNP-based composite anode developments.

Figure 3:
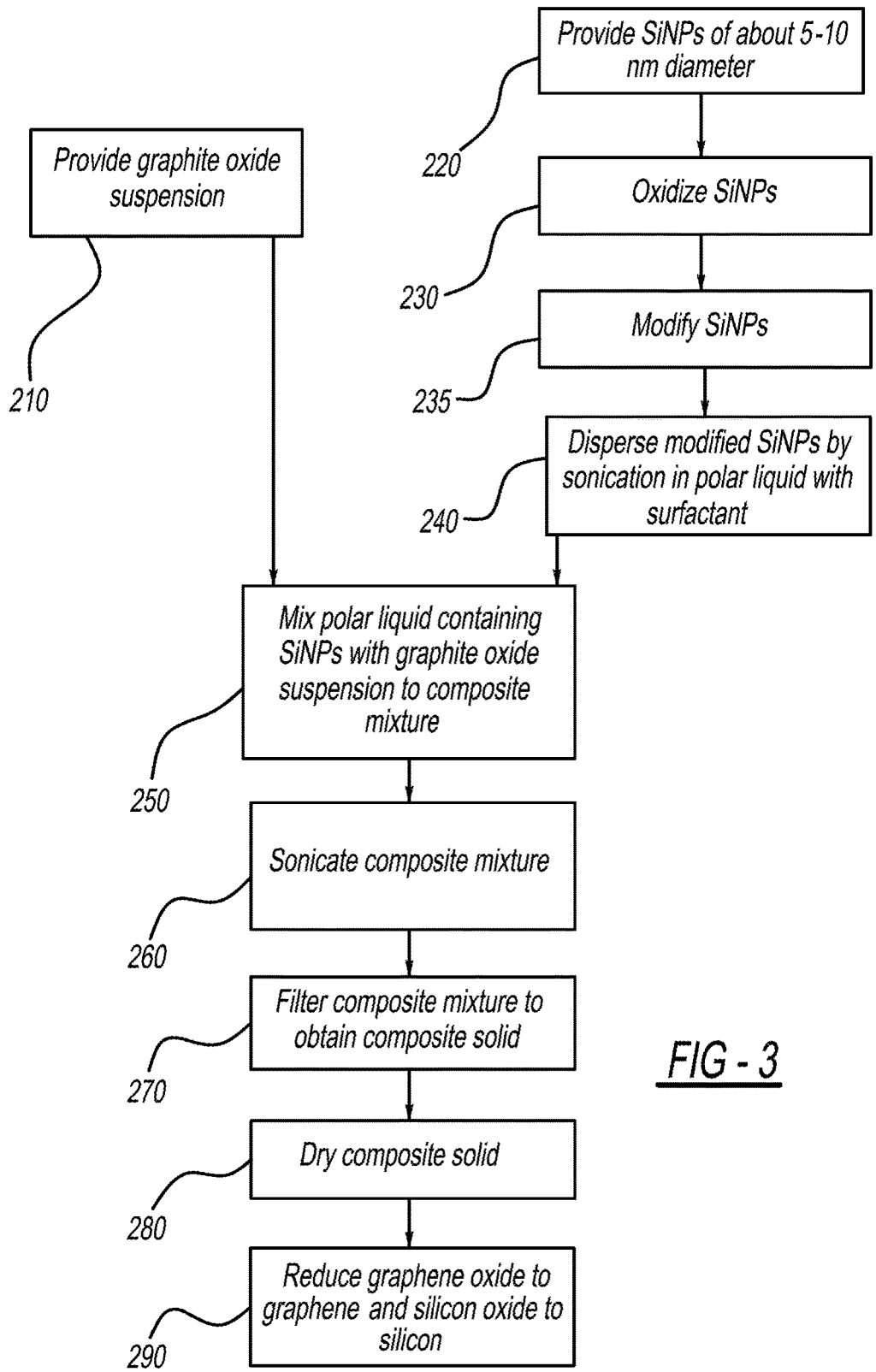
FIG. 3 shows a flow chart with steps of manufacturing a composite mSiNP-graphene anode.

The procedure of producing a composite mSiNP-graphene anode is depicted in the flow chart of FIG. 3. As indicated in step 210, a graphite oxide suspension was prepared by the process described above in connection with samples S1, S2, and S3. The SiNPs were sourced according to the same specifications as in connection with S1, S2, and S3, as indicated in step 220. Likewise, the oxidation of the nanoparticles specified in step 230 followed the same process as for samples S1, S2, and S3.

After the surface oxidation of the SiNPs, however, the SiNPs were modified in an additional intermediate step 235. For depositing carbon (C) on the SiNPs for producing CSiNPs, both acetylene (about 80 mL/min) and Ar (about 160 mL/min) gases were fed to a tube furnace. A reaction temperature was maintained at about 500° C. for about 2 hours to deposit carbon (C) on the particles. For nitriding the SiNPs an anhydrous ammonia feed (120 mL/min) was used to introduce nitrides to the SiNPs within the quartz tube furnace to form the $SiN_xNPs$. The furnace was heated to about 950° C. with varying heating times (about 2, 4, 6 and 15 hours) to reflect the increase in N-content of the nitrided particles. After the respective modification steps, the mSiNP were stored back to the isolation glovebox to prevent any unwanted reactions with the room ambient atmosphere.

Composite Anode Formation

In the dispersion step 240, the mSiNPs were weighed and then dispersed using a surfactant-enhanced dispersion technique similar to the process described above for sample S3. The mSiNPs were first dispersed in methanol and sonic probed (Misonix, Ultrasonic Cell Disruptor, Farmingdale, N.Y., 100 W, 22.5 kHz) for 15 min; afterwards about 1% (v/v) of n-octyl alcohol (about 99%) was added to the methanol. Then the dispersion was subjected to about 45 min of additional sonics. The n-octyl alcohol formed the surfactant on the mSiNPs. After this dispersion step 240, a self-contained composite anode was produced without the need for binders or conductive diluents. An appropriate amount of graphite oxide suspension was added to the dispersion in step 250 to obtain a mSiNP:graphene weight ratio of about 1:1. Then, in step 260, the mixture was sonic probed for about 2 hours to exfoliate the expanded structure of graphite oxide to graphene oxide platelets, while at the same time dispersing the SiNPs. All sonics-based steps were performed in room temperature conditions and were closely monitored to minimize temperature increase. In a filtering step 270, the respective sample was vacuum-filtered (setup: Millipore 47 mm all-glass vacuum filter holder—funnel and flask; filter: 0.2 μm pore, Whatman Anodisc) forming a solid composite. During filtration, SiNP cross over was minimized due to the initial deposition of graphene oxide platelets on the filter surface. in a drying step 280, the resulting composite solid was then air-dried overnight. In step 190, the dried composite solid underwent a reduction to reduce the graphene oxide platelets stacked in the composite solid to graphene platelets and the surface-oxidized silicon to silicon. In the described example, the reduction was performed by thermal reduction. The reduction was carried out using about 10% H2 (balance Ar, about 100 mL/min) at about 700° C. for about 1.25 hours. After the reduction, the isolated mSiNP-graphene composite material was sampled, weighed and prepared for testing.

Figure 5:
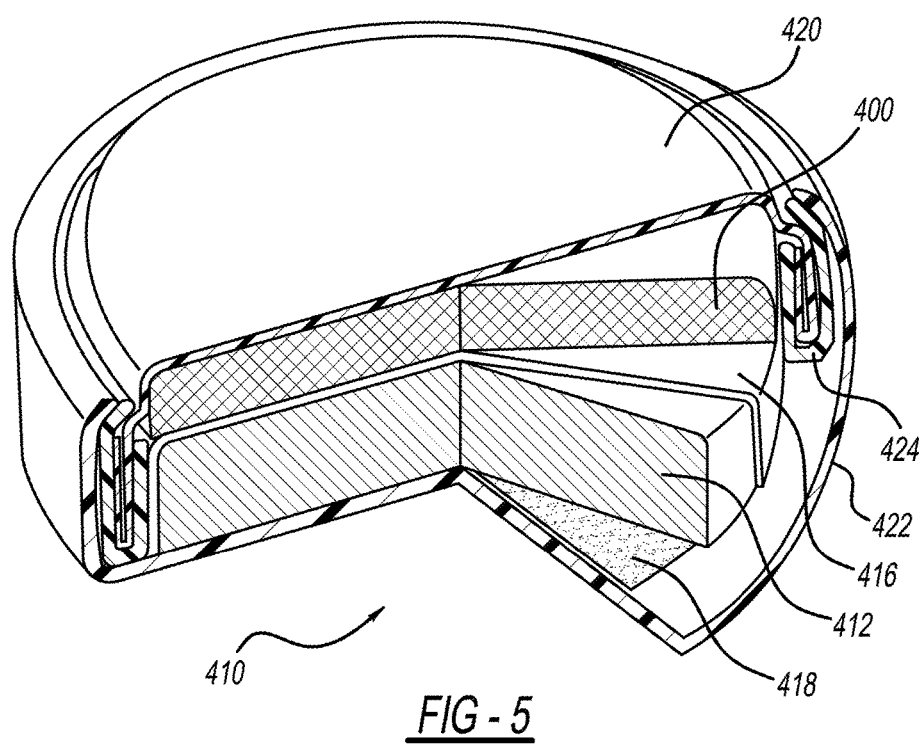
FIG. 5 schematically shows a second battery utilizing a composite mSiNP-graphene anode.

Now referring to FIG. 5, the resulting mSiNP-graphene anodes were installed in button cells 410. FIG. 5 is not to scale, and layer thicknesses are exaggerated for illustrative purposes. The cells 410 were assembled using a positive can 422 and a negative cell terminal 420, separated by a non-conducting grommet 424. The anode 400 and the cathode 412 were separated by a separator layer 416 having a thickness of a few microns. The cells 410 were loaded typically with about 0.5 mg of the composite anode 400 (about 1.5 mg/cm$^2$, about 5-10 μm thick) as the working electrode and with a Li metal cathode 412 (about 99.9% purity, about 0.75 mm thick, Alfa-Aesar) acting as both counter and reference electrode (half-cell configuration). A solution of about 1.0M LiPF6 was dissolved in ethylene carbonate (EC)/dimethyl carbonate (DMC) at a concentration of about 1:1 (v/v). The resulting solution was used as the electrolyte. The cells 410 were assembled and sealed (crimped) in an Ar-filled isolation glovebox. An optional current collector layer 418 may be arranged between the cathode 412 and the positive can 422, but the measurements were performed without the current collector 418.

For testing the assembled cells 410, transmission electron microscope (TEM) micrographs were acquired on a JEOL-2010 FasTEM at 200 kV. Scanning electron microscopy (SEM) images were taken using a JEOL (Peabody, Mass.) Model JSM-6510LV-LGS at 25 kV. Chemical composition analysis was done using the equipped Energy Dispersive X-ray Spectrometer (EDS).

Electrochemical Characterizations

Figure 8:
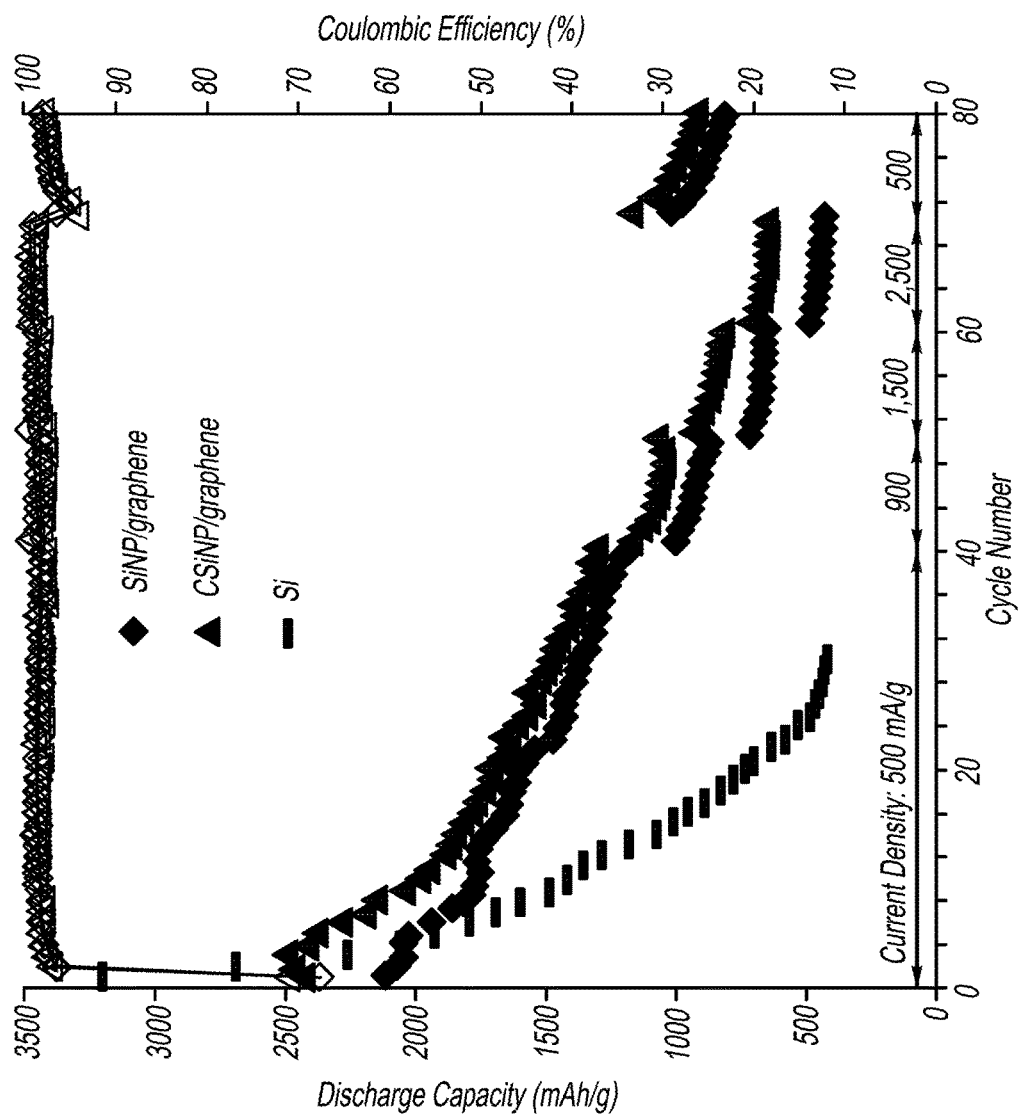
FIG. 8 shows a comparative diagram of the cycling performances of the composite anode made from sample S3 for various current densities, of a CSiNP-graphene composite anode for various current densities, and of the silicon anode for a current density of 300 mA/g (from literature).
Figure 10:
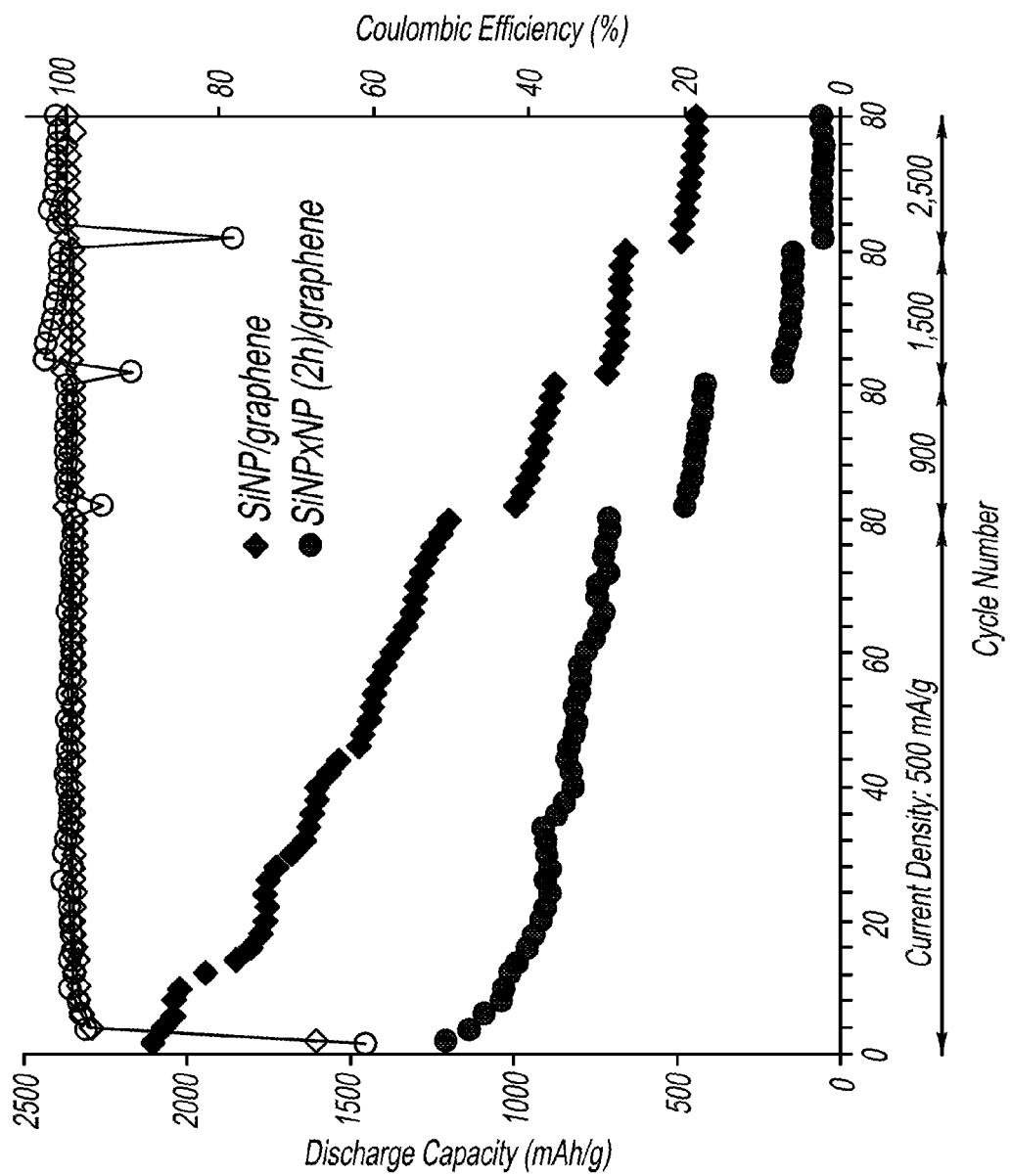
FIG. 10 Discharge capacity performance of the composite anode made from sample S3 and of a composite anode of $SiN_xNP$ (2h)-graphene using various current densities.

Now referring to FIGS. 8 and 10, electrochemical cycling of the assembled cells containing the CSiNPs and of the cells containing the $SiN_xNPs$ was galvanostatically performed with a cut-off voltage range of about 0.01-2.0V while maintaining a constant current density of about 500 mA/g for about 40 cycles. After this step, varying densities of about 900, about 1500, and about 2500 mA/g were used after every 10 cycles to assess the rate performance of the cells. The cells were then cycled back to a current density of about 500 mA/g in order to measure the changes in capacity following previous high current density cycles. As shown in An investigation on the effect of varying the charge cutoff potential was explored for the composites containing the $SiN_xNPs$. Tests were conducted using the following charge cutoff voltages: about 0.1V as plotted in FIG. 11a, about 0.035V as plotted in FIG. 11b, about 0.05V as plotted in FIG. 11c, and finally about 0.02V as plotted in FIG. 11d. The baseline performance was evaluated using around 0.5 mg of composite anode containing bare SiNP (without any modifications). The electrochemical tests were done using either a Gamry (Warminster, Pa.) Reference 3000, Gamry series G 300 or a Maccor (Tulsa, Okla.) Series 4200 cycler.

CSiNP-Graphene Characterizations

The deposition of C on SiNPs produced CSiNP. Closer TEM examination revealed that the SiNPs are enveloped in a C layer. This coating process may allow fine-tuning the process to achieve an optimal coating while avoiding excess formation of strings. After the overall formation process of the CSiNP-graphene composite anode, EDS analysis reveals that the compositions are as follows: about 51% Si, about 3% O and about 46% C by weight.

FIG. 8 illustrates the resulting electrochemical performance as compared with a composite anode made from sample S3 and with a pure Si anode. At the first discharge of the samples, the composite anode containing CSiNP showed a discharge capacity of about 2426 mAh/g, an improvement of about 15% compared with the composite using plain SiNP (about 2100 mAh/g). The Coulombic efficiency of CSiNP-graphene likewise presents a slight improvement compared with SiNP-graphene (about 71% vs. about 67%). These results are to be expected since the amorphous C deposits/coatings of CSiNP can act as supplementary Li interaction sites that can contribute to increase the capacity, as well as due to the more intimate contact of C with the SiNP the particles are more protected from side reactions thus achieving higher efficiency. Going towards the 40th cycle (using about 500 mA/g current density) the improvement of C deposit/coating was retained to a value of about 8%, cycles for both composite anodes show the same decreasing trend (with greater than about 99% Coulombic efficiency), further optimization of the C deposition parameters could open up a window of opportunity for further performance improvements. It is also noteworthy that the SiNP-graphene already has better performance compared with other works that are based on the pairing of SiNPs and C-based matrix, meaning that the present composite of CSiNP is already a good battery performer. During the higher rate discharges (about 900, about 1500 and about 2500 mA/g) it is clearly evident that the CSiNP-graphene displays a better rate performance. The improvement amounts to about 50% over the SiNP-graphene anode (for about 2500 mA/g current density). This improvement is due to the improved conduction path brought by the C coating. Reverting back to the original current loading in cycles 71 to 80, CSiNP-graphene demonstrated that it can recover its capacity better than the SiNP-graphene composite. Pristine Si performance is also depicted in FIG. 8. The two composites clearly show a better cycling performance even with higher current densities. The data for Si were obtained with a current density of about 300 mA/g.

$SiN_xNP$-Graphene Characterizations

Figure 9A:
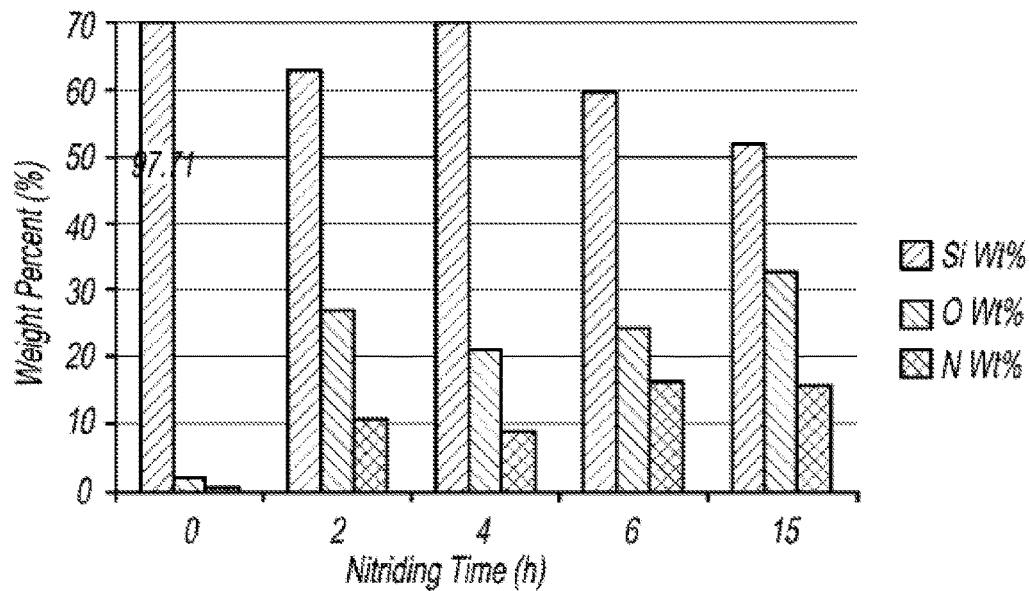
FIG. 9a shows a bar graph of an EDS analysis of SiNxNPs after nitriding for various times displaying the elemental content of Si, O, and N as weight percentages
Figure 9B:
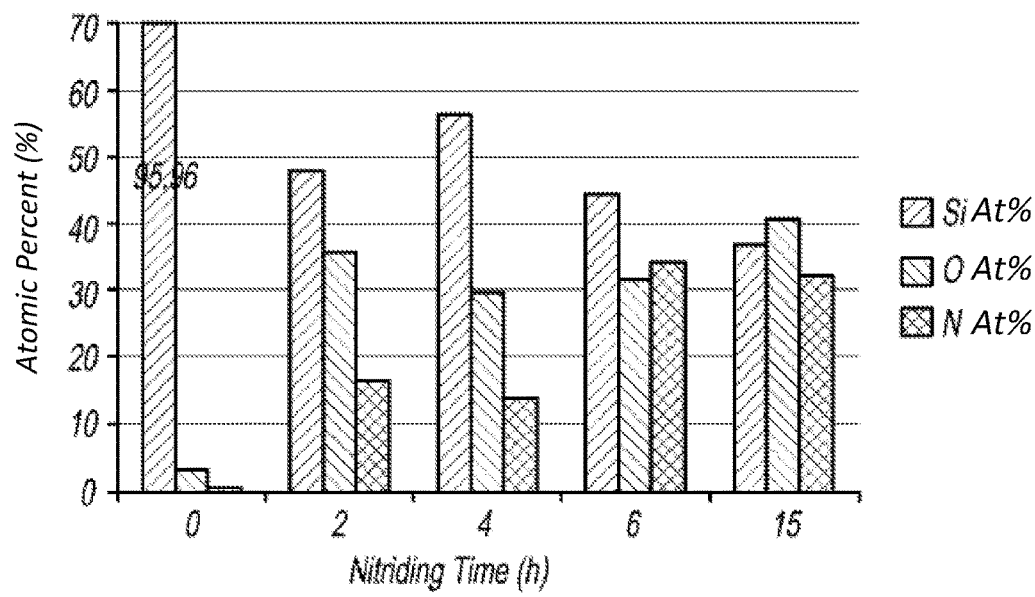
FIG. 9b shows a bar graph of the same EDS analysis as FIG. 9a displaying atomic percentages of the elemental content.

Nitride doping of the particles produced $SiN_xNPs$. EDS analysis as nitriding time is varied is presented in FIGS. 9a and 9b by weight and by atomic percentages, respectively. The amount of nitrogen (N) within the $SiN_xNPs$ increased as from low nitriding times (2 and 4 hours) to high nitriding times (6 and 15 hours). Since the particles are doped with other elements, the amount of Si decreases with nitriding time as projected. The significant increase in O content is very noteworthy; these could have resulted from the nitriding conditions: prolonged exposure to high temperature (about 950° C.) with the possibility of incomplete purging of the air inside the quartz tube prior reaction.

As FIG. 10 shows, the effect of this O intake can be seen on low discharge capacities for cycling of the composite SiNxNP(2h)-graphene containing particles nitrided for two hours. Compared with the formulation ratio of 1:1 (w/w) (mSiNP:graphene) and the EDS result, the composite has a silicon content of about 31% Si. Using these numbers, the first discharge capacity observed is still within expected range (observed: about 1200 mAh/g, expected: about 1300 mAh/g) and displays a Coulombic efficiency of about 61%. The low efficiency is likely a result of the combination of decreased kinetics involving the Si oxides (SiOx), high surface area of the particles and graphene, and formation of the SEI. Comparing the rate of decrease of capacity, the SiNP-graphene anode shows much steeper slope compared with the anode consisting of SiNxNP(2h)-graphene. At the end of cycle 40 (using about 500 mA/g), SiNP-graphene displays only about 56% (about 1200 mAh/g) of the original discharge while SiNxNP(2h)-graphene shows a slight improvement at about 60% (about 710 mAh/g).

The cycles for higher rates, however, show that SiNxNP (2h)-graphene anodes have poorer performance than the composite with unmodified SiNP of sample S3. Since there is a large amount of oxygen (O) in the nitrided particles, this O significantly affects the anode's electronic properties and thus exhibits the rate performance in FIG. 10. The Coulombic efficiencies are still very high at greater than 99%, which gives an insight as to the possibility of the anode materials being capable of better performance once the O content is controlled.

The SiNxNP displayed an improved capacity retention over the unmodified particles of sample S3. To assess further improvements, varying levels of nitriding underwent cycling with varying charge cutoff potential. A summary of the test runs is shown in FIGS. 11a, 11b, 11c, and 11d. The four plots show successive runs (cycles in a, then b, c and finally d) that were done with the same batch of samples (about 2, 4, 6 and 15 hours). In FIG. 6a, the initial discharge capacities are as follows: about 575, about 575, about 476 and about 460 mAh/g for the composites with particles that are nitrided for about 2, 4, 6 and 15 hours, respectively. There is a large drop in capacity between the first and second cycles that is attributable to the composites' formation of the SEI and exposure to side reactions. From the second to the 40th cycle, it becomes evident that those samples that contain the least amount of N, display higher capacity losses than those with a higher N content. The highest N content was achieved among the composites after nitriding for about 15 hours. For the composite containing particles nitrided for about 6 and 15 hours, the discharge capacity levels off nearly horizontally, starting around cycle 7. As the applied current densities were increased to about 900 mA/g and about 1500 mA/g, the samples with a higher amount of nitriding show a better rate performance. Considering that the cutoff potential of these runs was at 0.1V, representing a mild discharge, and that the low nitride-containing composites already display significant capacity drops, it can be concluded that an increase in N content in the SiNxNP can lead to improved cycle stability and rate performance, despite the relatively low capacity, which is attributable to the high O content.

Figure 11A:
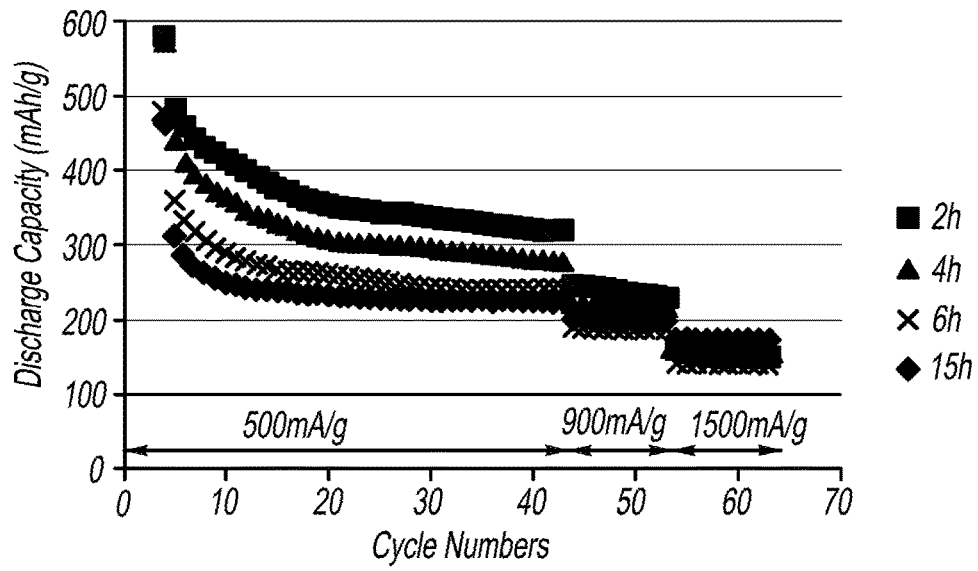
FIG. 11a shows a first diagram of variable discharge cycling performance of SiNxNP-graphene composites after different nitriding times of two, four, six, and 15 hours with a cutoff potential of 0.1 V at various current densities.
Figure 11B:
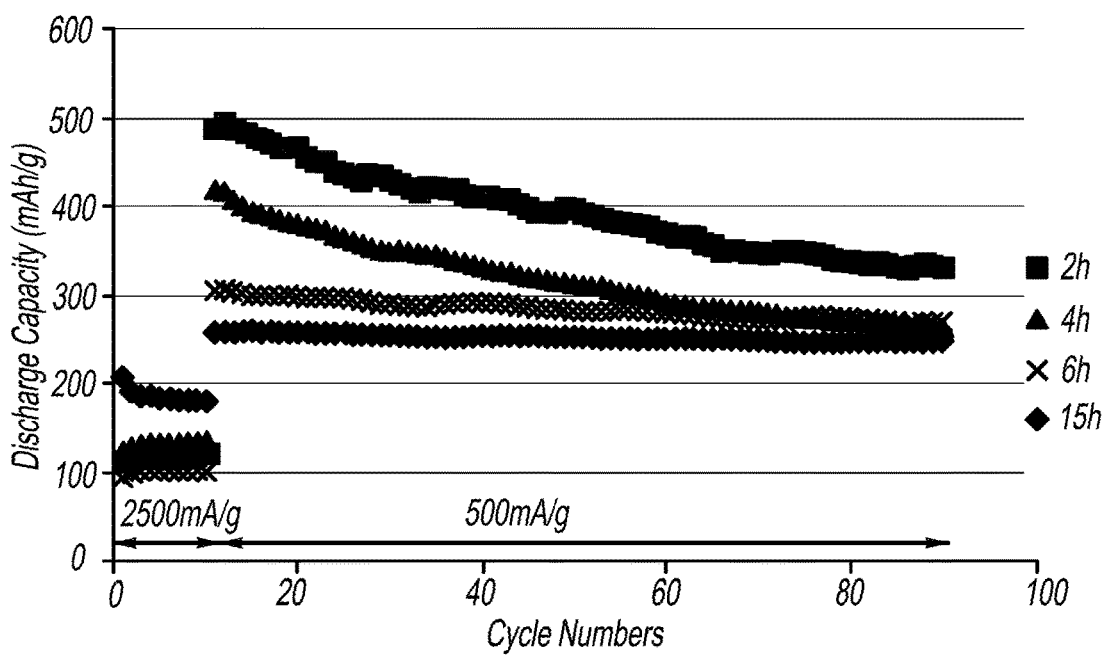
FIG. 11b shows a second diagram of variable discharge cycling performance similar to FIG. 11a, but for a cutoff potential of 0.035 V.
Figure 11C:
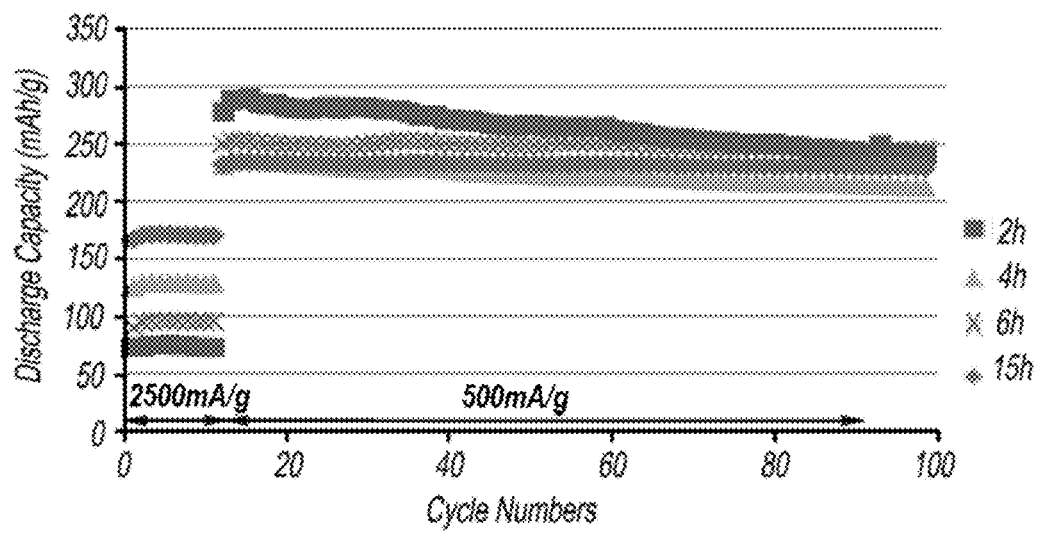
FIG. 11c shows a third diagram of variable discharge cycling performance similar to FIGS. 11a and 11b, but for a cutoff potential of 0.05 V.
Figure 11D:
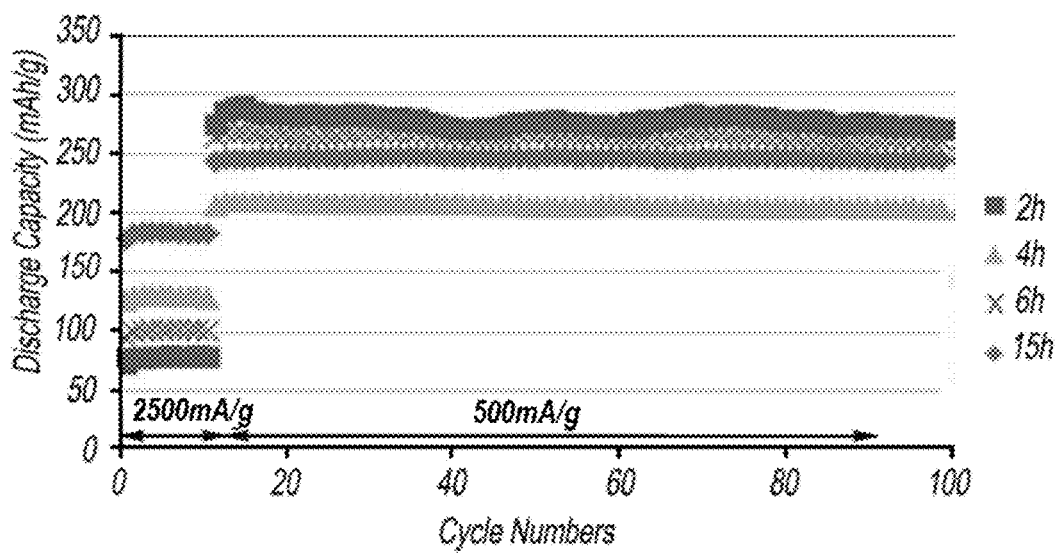
FIG. 11d shows a fourth diagram of variable discharge cycling performance similar to FIGS. 11a through 11c, but for a cutoff potential of 0.02 V.

In FIGS. 11b through 11d, the cycling runs start at the highest set current density of about 2500 mA/g to be able to exhibit high rates and for observing recovery once the current density was returned to 500 mA/g starting from cycle 11. In all the runs using 2500 mA/g, the samples containing the 15-hour nitrided particles exhibit the highest capacity, even though these samples had the least initial capacity as seen in FIG. 11a. This behavior is evidence for the improvement in rate performance. In FIG. 11b, since the cutoff potential was lower at about 0.035V, the composites were discharged deeper and the capacities start higher than those in the 40th cycle of FIG. 11a. The samples with higher N content nitrided for about six and about 15 hours, respectively, showed significantly less decay that those using two-hour and four-hour composites, which still showed irreversibilities that translate to performance decay. For FIGS. 11c and 11d, the two-hour and four-hour composites are beginning to reach a stable capacity that is very comparable to those nitrided for six and 15 hours. This is an indication that higher N content in SiNxNP causes faster and better stabilization of the discharge capacity, even at varying levels of discharge as dictated by the cutoff potentials. While the first discharge capacities of the composites nitrided for two hours and for 15 hours were very different, they eventually became comparable at about 270 mAh/g and about 245 mAh/g, respectively. Improving the initial capacity of the high N-containing samples through means such as minimizing O content can increase the stable capacity that is relatable to the Si content of the samples.

In summary, the present C deposition or coating presents an improvement in both capacity retention and rate performance compared to the unmodified SiNP-graphene composite, which already demonstrates better performance that other Si and C based anodes. Introduction of nitrides in the SiNP to be used in SiNxNP-graphene composite results in improved stability of discharge capacity (also at varying levels of discharge). Further optimization of both modification steps to achieve the appropriate amount and morphology of C coating and to control O and N content can potentially present major improvements in the anode's overall stability and rate performance.

CONCLUSION

Composite anodes of Si nanoparticles (SiNPs) and graphene sheets with highly-dispersed SiNPs were synthesized in order to investigate the performance related improvements that particle dispersion can impart. Three composites with varying degrees of particle dispersions were prepared using different ultrasonication, and a combination of ultrasonication and surfactant. With more dispersed SiNPs, the capacity retention and rate performance as evaluated by galvanostatic cycling using increasing current density rates (about 500-2500 mA/g) also improved compared with anodes that have poor particle dispersion. These results demonstrate that better nanoparticle dispersion (small clusters to mono dispersed particles) between the stable and highly conducting graphene layers, allows the carbonaceous matrix material to complement the SiNP—Li$^+$ electrochemistry by becoming highly involved in the charge-discharge reaction mechanisms as indicated by chronopotentiometry and cyclic voltammetry. Particle dispersion improvement was confirmed to be a key component in a composite anode design to maximize Si for high performance lithium ion battery application (LIB) application.

The combination of high power sonication with surfactants can produce improved particle dispersions containing non-agglomerated SiNPs (about 10-20 nm) to small particle clusters (less than about 100 nm) within the composite. With this attribute, charge-discharge profile and CV curves of the anode suggest that the mechanism of Li$^+$ accommodation/release highly involves the stable and conducting graphene matrix. Together with the electrochemical benefits of having SiNPs, the composite anode material displays higher capacity retention and better rate performance in contrast with other composites with poor particle dispersion. Particle dispersion improvement is a step forward in composite anode design to maximize Si for high performance LIB application.

For further performance improvements, composite anodes of Si nanoparticles (SiNPs) with C-based and with N-based modifications and graphene were synthesized. Galvanostatic cycling using increasing current density rates (500-2500 mA/g) of composites containing particles with C coating/deposition show improvements (at most 50% during 2500 mA/g) in both capacity and rate performance. The offered protection of the C coating and the improvement in the conduction path is likely the reason. The results also demonstrate that N content in nitride particles play a big role in stabilizing the electrode's cycling capacity. The dilution of Si in the SiNxNP leads to lower cycling stresses and stable SEI. Optimization of the methods to achieve the desirable amount of C-coating and the control of N and O contents enables significant performance improvements in Si-based anodes for lithium ion batteries (LIBs).

The use of facile thermal vapor deposition techniques can modify the SiNPs to have C-based coating or contain nitrides within its structure. The C coating in CSiNPs-graphene improve both capacity retention and rate capability by protecting the SiNPs from detrimental SEI and side reactions as well as provide a better conducting network. As the nitrides are increased in SiNxNP-graphene, the stability of the capacity is also improved. The dilution of the N molecules decreases stress in the particle structure. Proper control of the modification techniques could potentially offer better overall performance that is much need by LIBs to properly address current and future performance demands.

Drawings in the figures illustrating various embodiments are not to scale. Some drawings may have certain details magnified for emphasis, and any different numbers or proportions of parts should not be read as limiting. Those skilled in the art will appreciate that embodiments not expressly illustrated herein may be practiced within the scope of the present invention, including those features described herein for different embodiments, and may be combined with each other and/or with currently-known or future-developed technologies while remaining within the scope of the claims presented here. Moreover, the advantages described herein are not necessarily the only advantages of the invention and it is not necessarily expected that every embodiment of the invention will achieve all of the advantages described. It is therefore intended that the foregoing detailed description be regarded as illustrative rather than limiting. And, it should be understood that the following claims, including all equivalents, are intended to define the spirit and scope of this invention.

The invention claimed is:

1. A composite anode for a lithium-ion battery, the composite anode comprising: a bulk anode matrix formed by graphene sheets; a plurality of silicon nanoparticles embedded in the graphene sheets, the silicon nanoparticles being surface-oxidized SiNx nanoparticles, the silicon nanoparticles having diameters mostly no greater than 10 nm, wherein most of the silicon nanoparticles are arranged in silicon nanoparticle clusters of diameters no greater than 20 nm,
wherein Nx refers to the weight percentage of elemental nitrogen (N) present in the silicon nanoparticles being in the range of about 10 wt. % to about 16 wt.

2. The composite anode of claim 1, wherein a portion of the silicon nanoparticles are embedded as single silicon nanoparticles.

3. The composite anode of claim 2, wherein most of the silicon nanoparticle clusters and the single silicon nanoparticles are spaced apart from neighboring silicon nanoparticle clusters and single silicon nanoparticles by a distance of at least about three times the diameter of an individual nanoparticle.

4. The composite anode of claim 1, wherein the silicon nanoparticles amount to at least about 30% by weight of the total weight of the graphene sheets and the silicon nanoparticles combined.

5. The composite anode of claim 4, wherein the silicon nanoparticles amount to about 50% by weight of the total weight of the graphene sheets and the silicon nanoparticles combined.

6. The composite anode of claim 4, wherein the silicon nanoparticles amount to at least about 50% by weight of the total weight of the graphene sheets and the silicon nanoparticles combined.

7. The composite anode of claim 1, wherein the nanoparticles are coated with a carbon layer.

* * * * *